C. E. HOPKINS.
MACHINE FOR MAKING STEREOTYPE PRINTING PLATES.
APPLICATION FILED FEB. 25, 1911. RENEWED JUNE 14, 1917.
1,286,323. Patented Dec. 3, 1918.
14 SHEETS—SHEET 1.
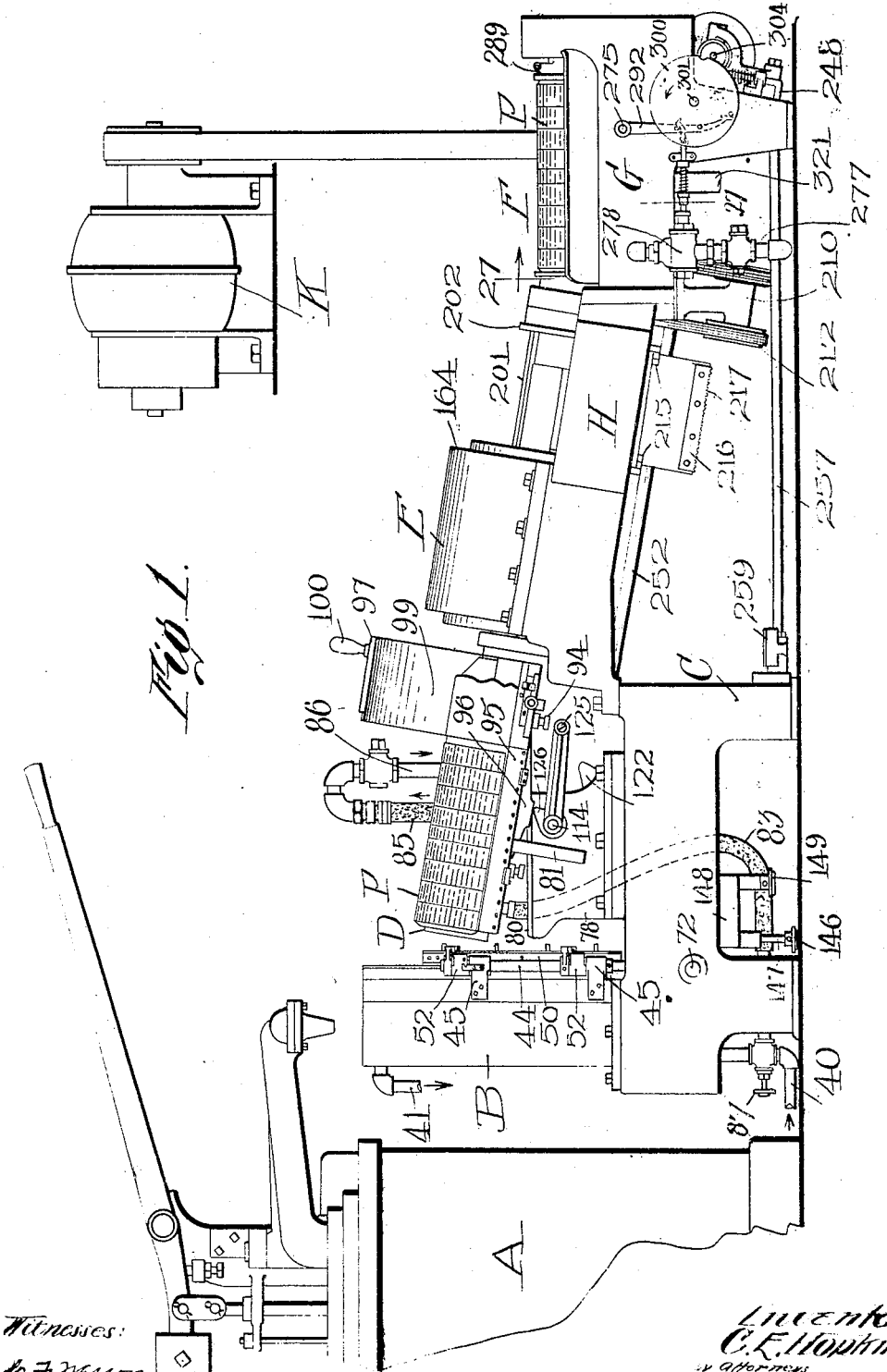

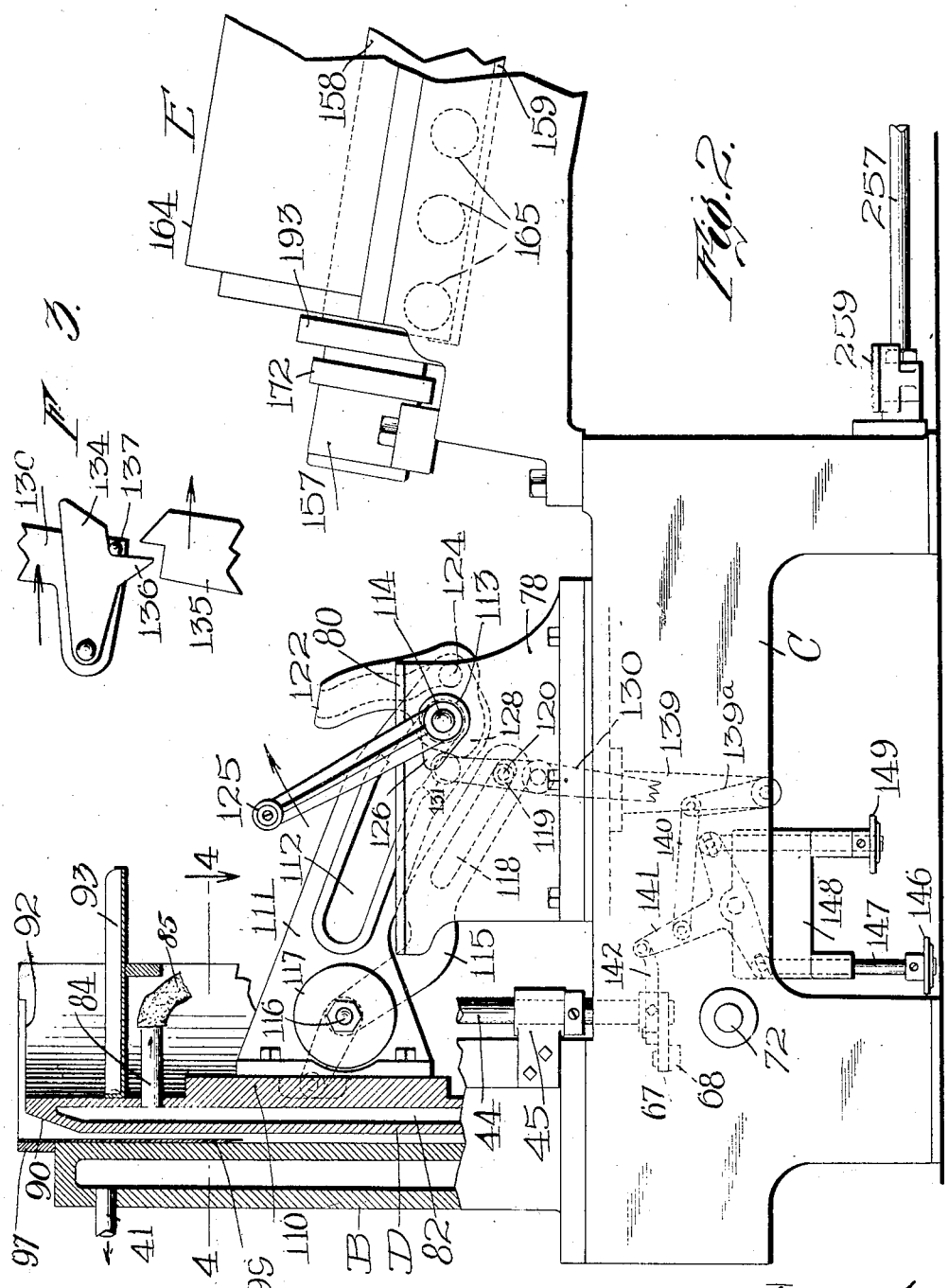

C. E. HOPKINS.
MACHINE FOR MAKING STEREOTYPE PRINTING PLATES.
APPLICATION FILED FEB. 25, 1911. RENEWED JUNE 14, 1917.
1,286,323.
Patented Dec. 3, 1918.
14 SHEETS—SHEET 3.
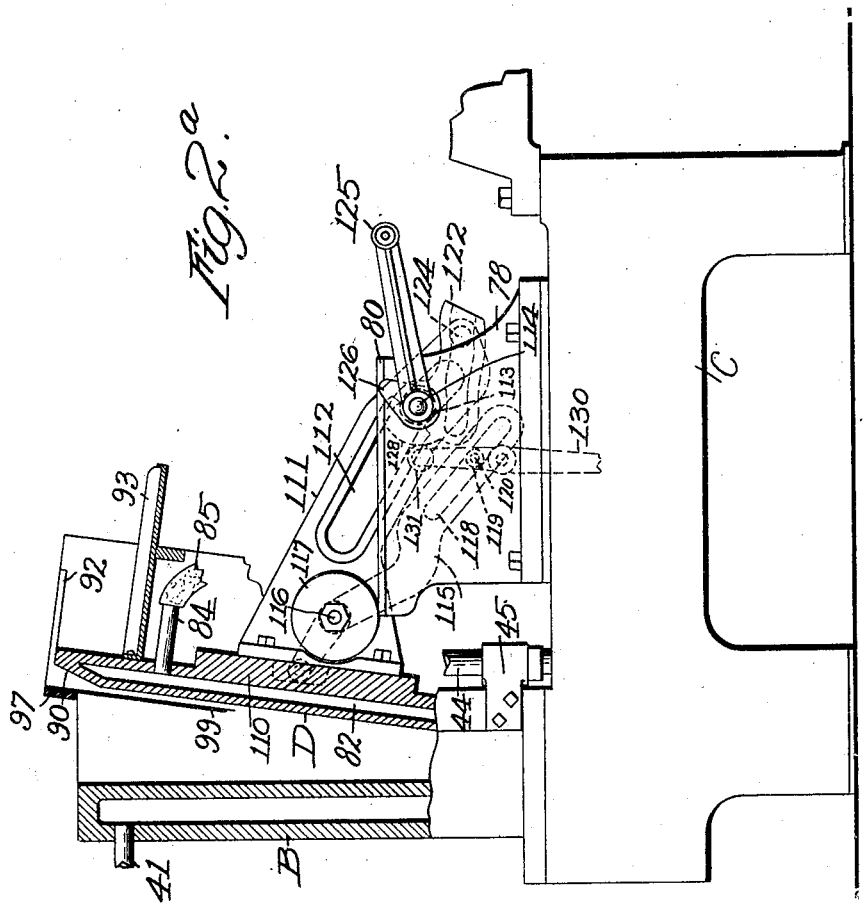

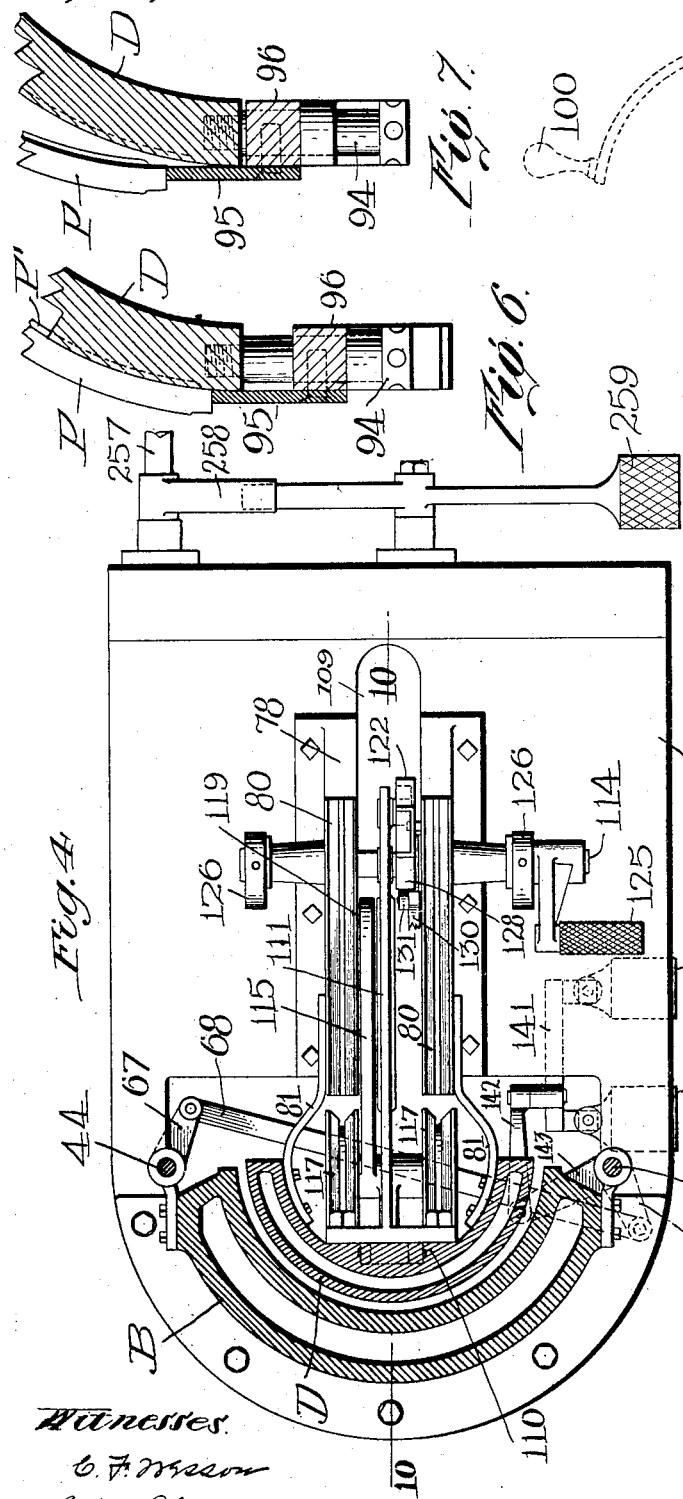

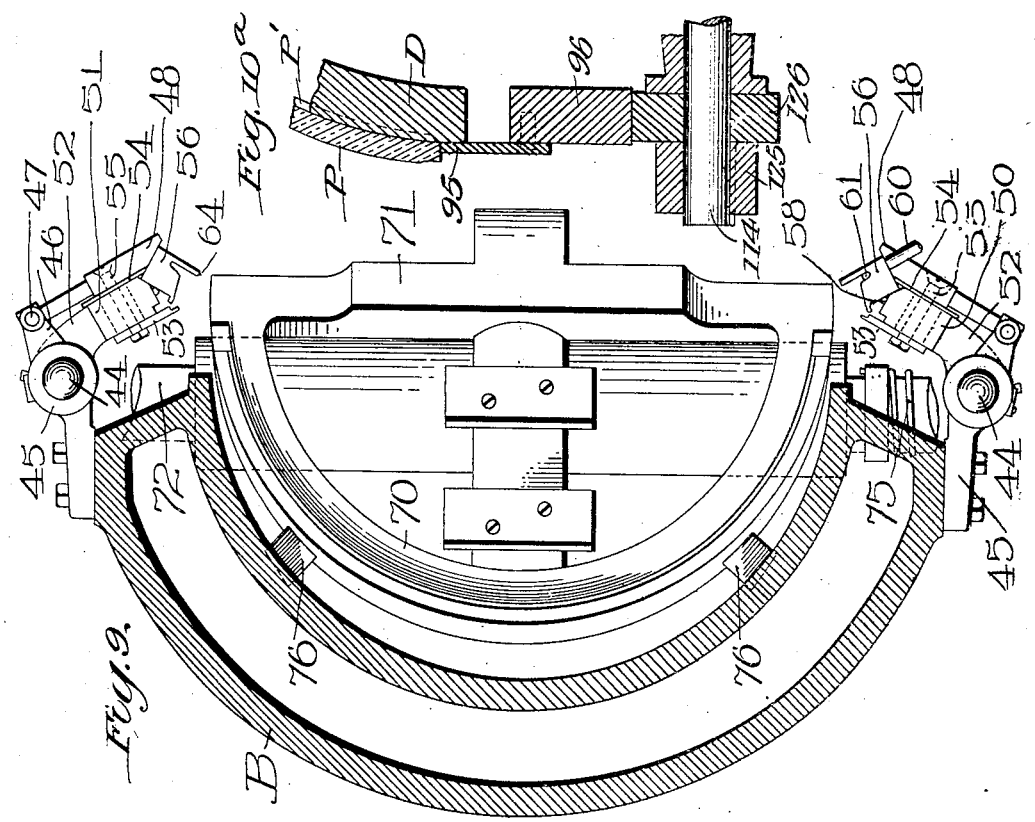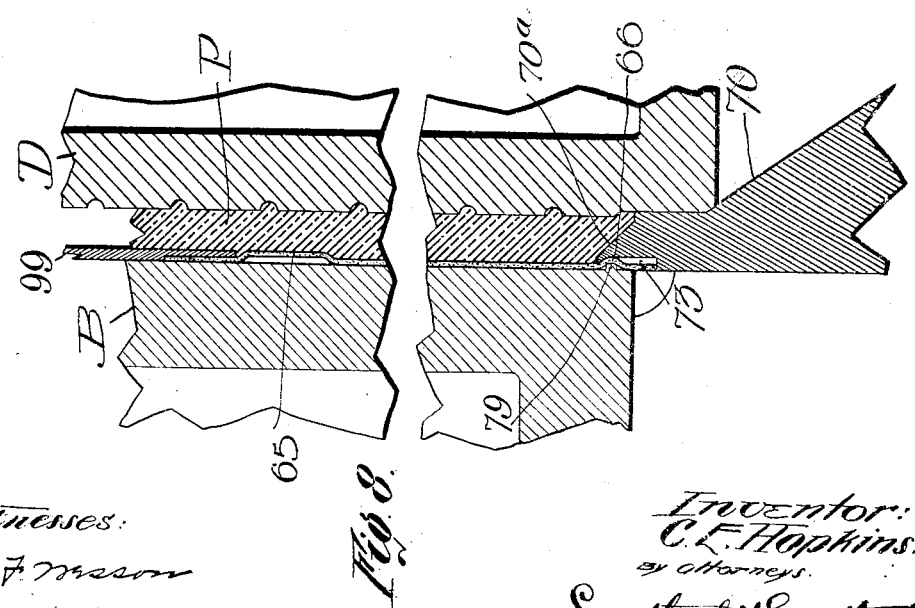

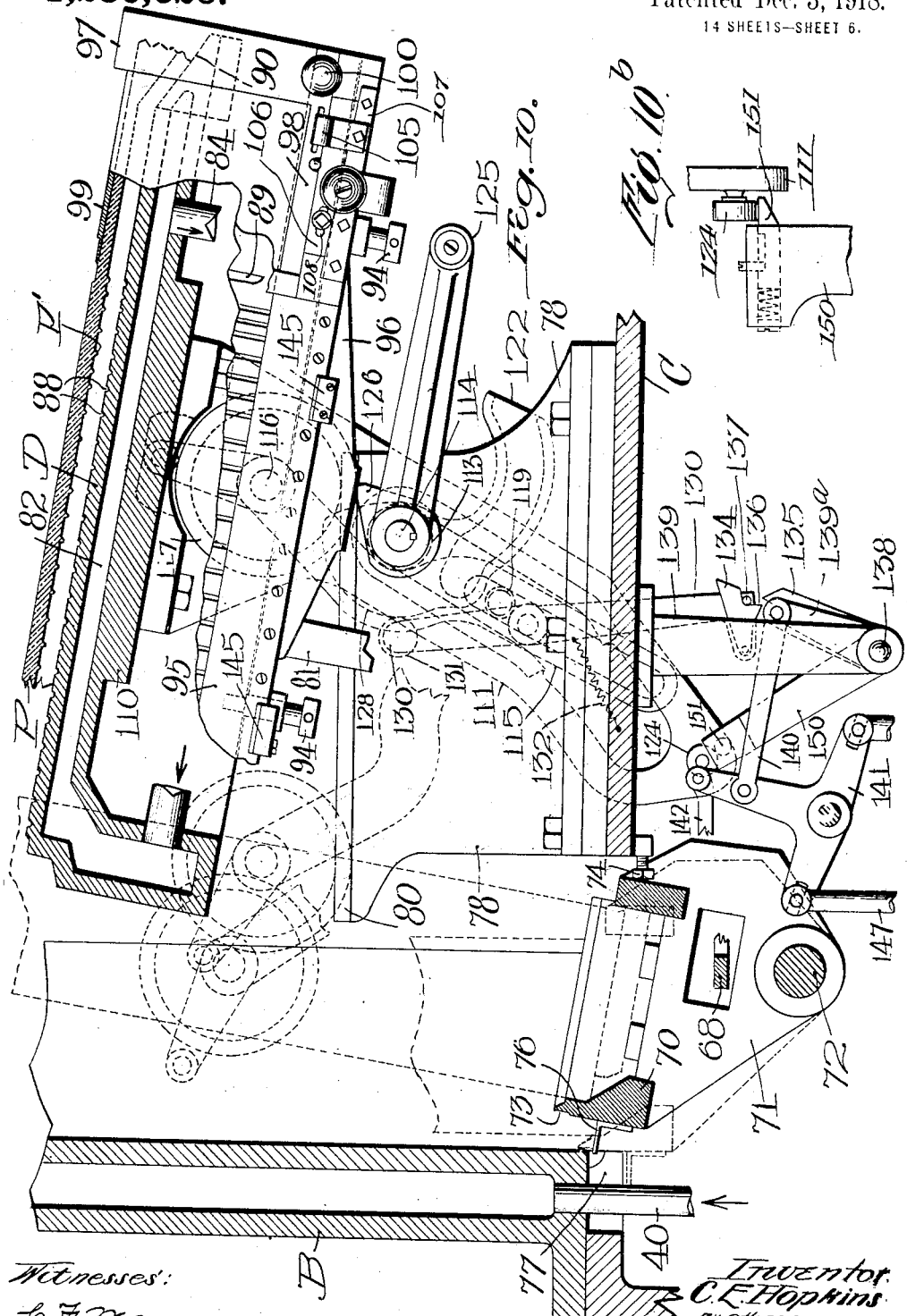

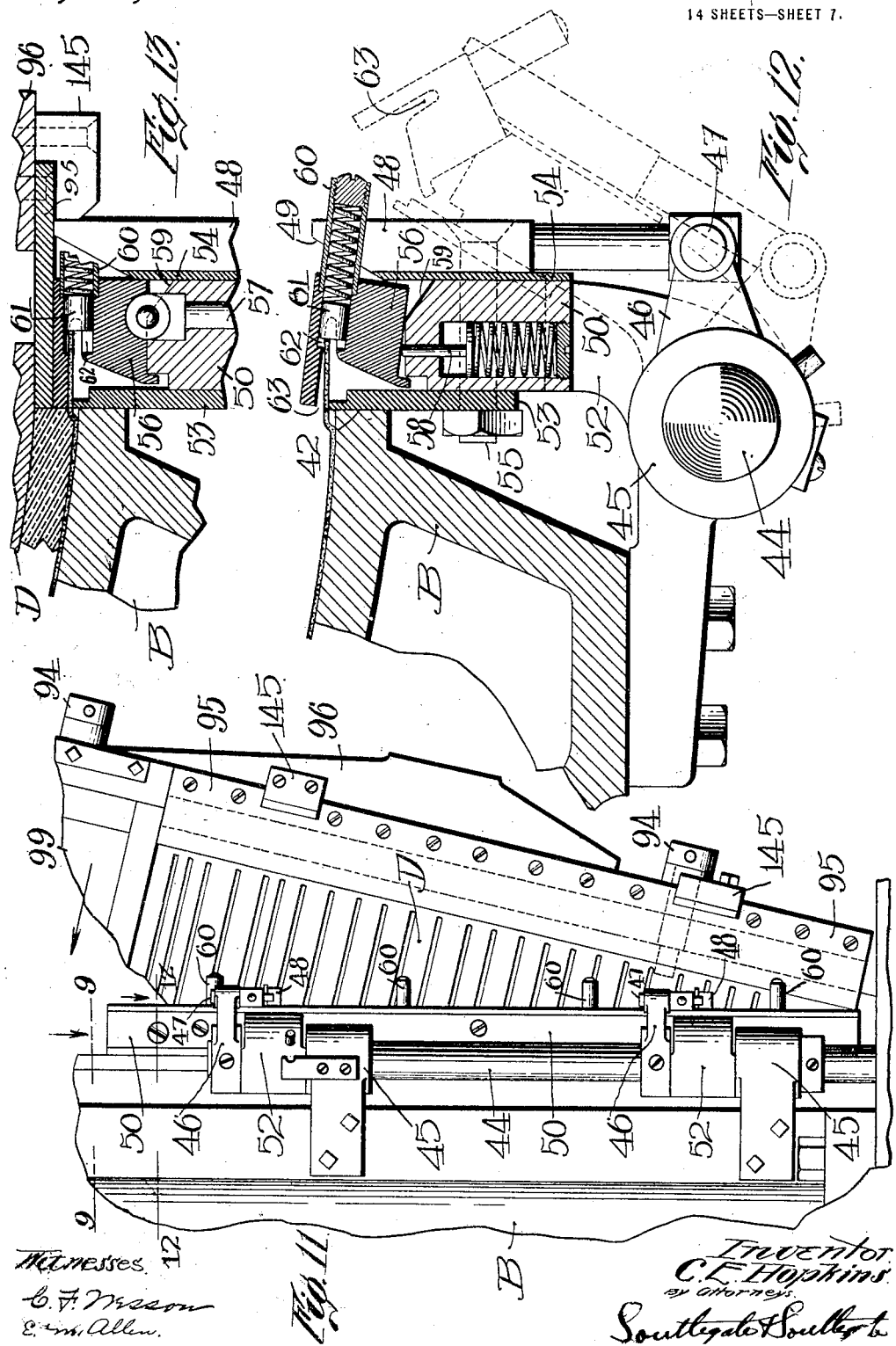

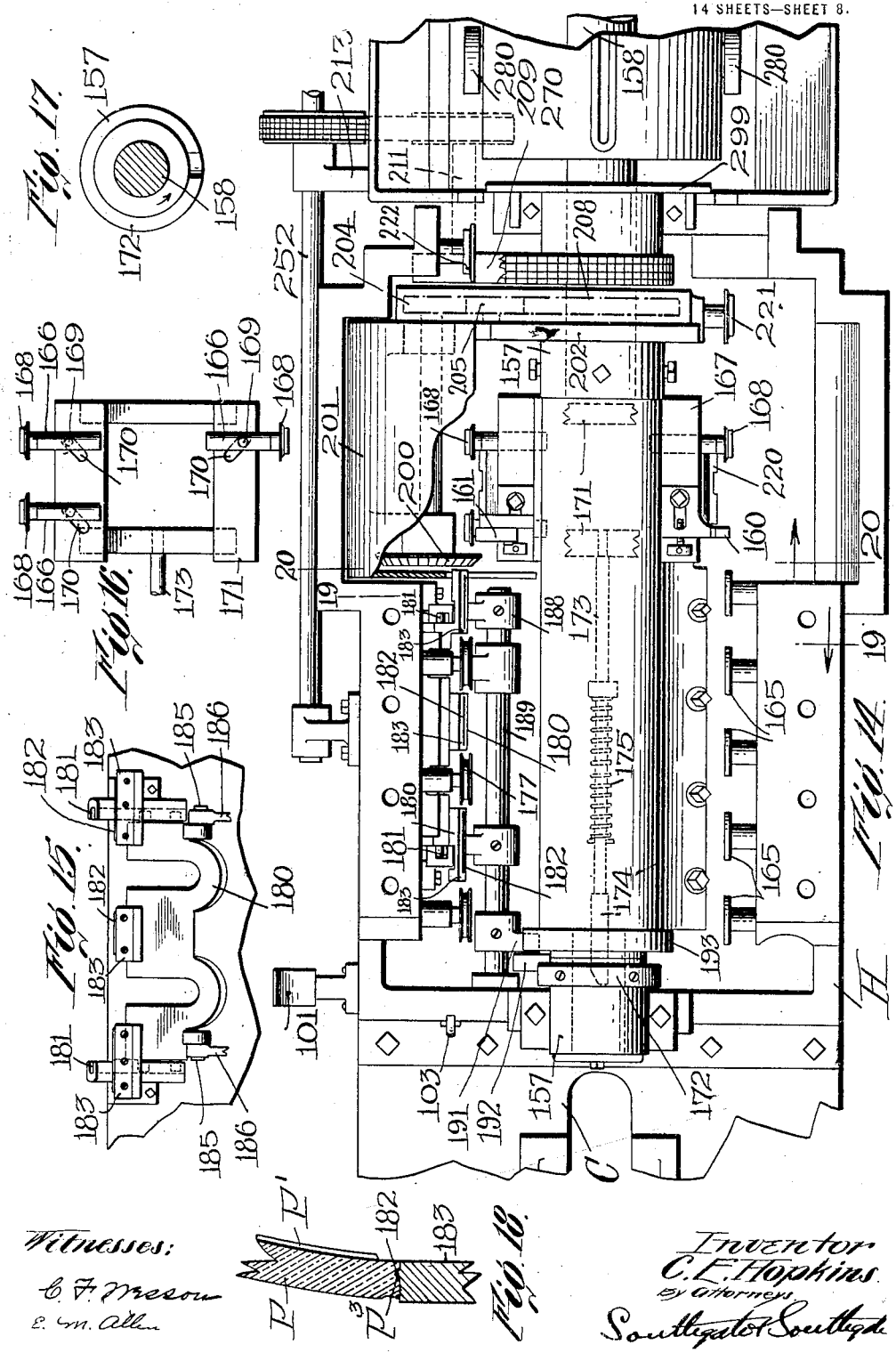

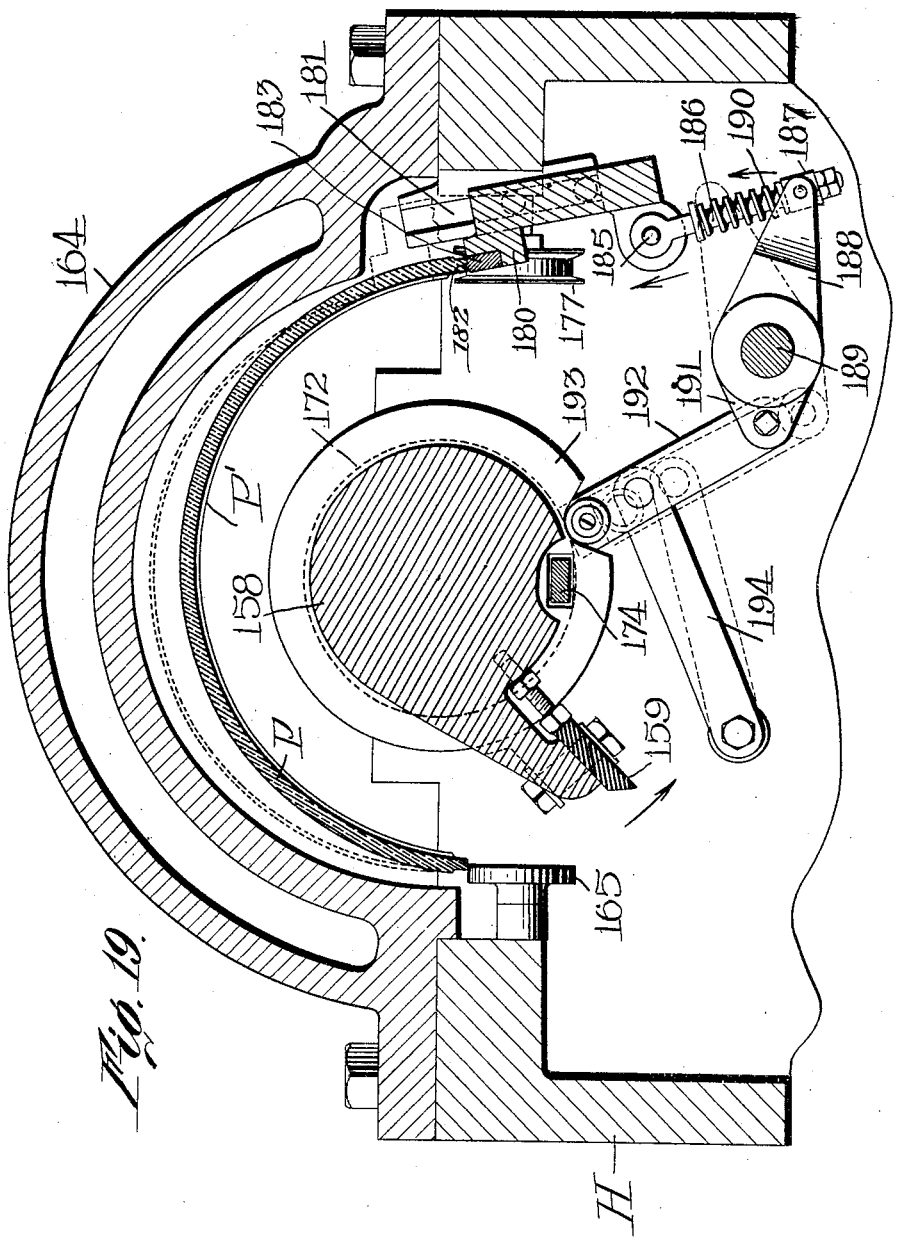

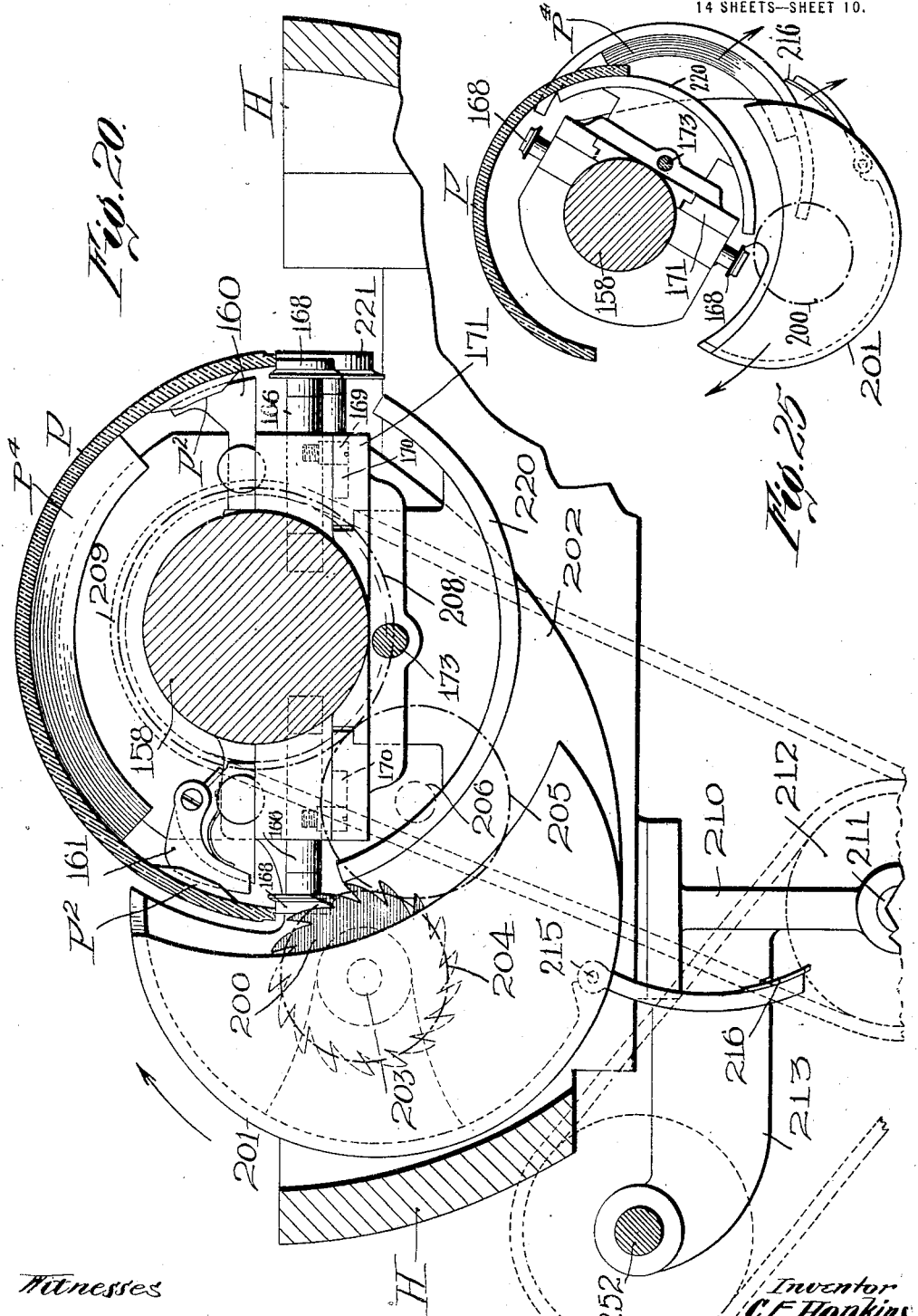

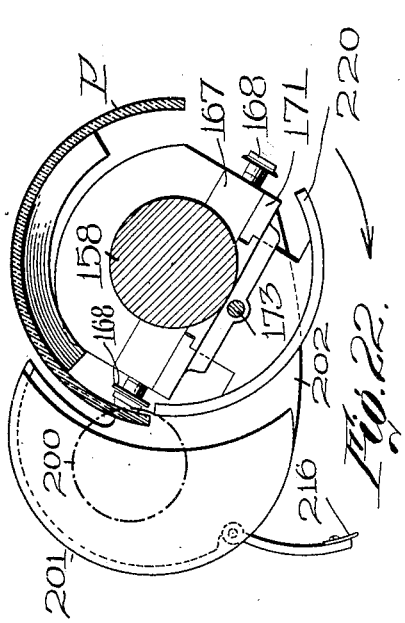
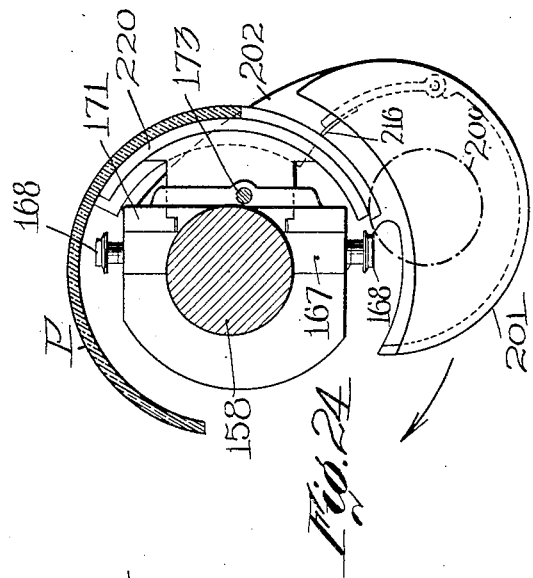
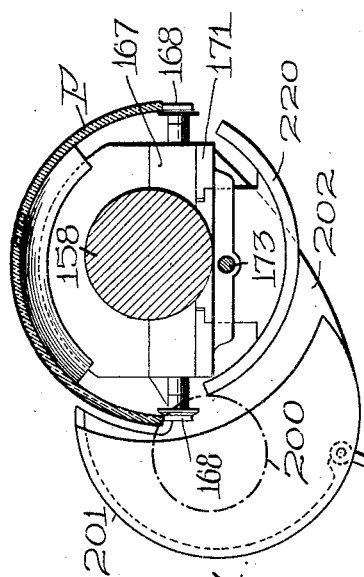
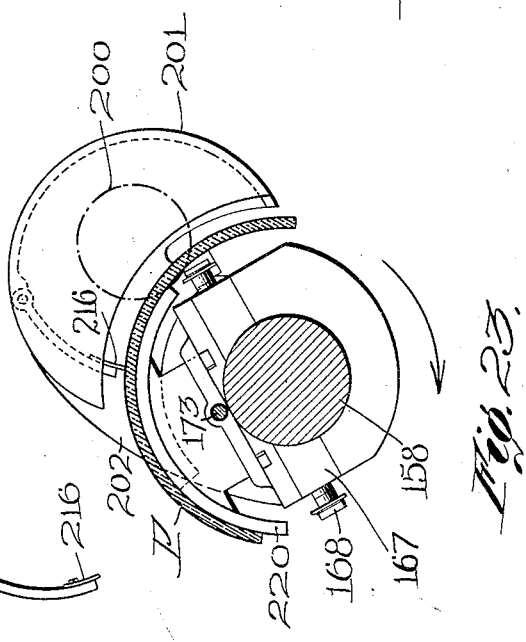

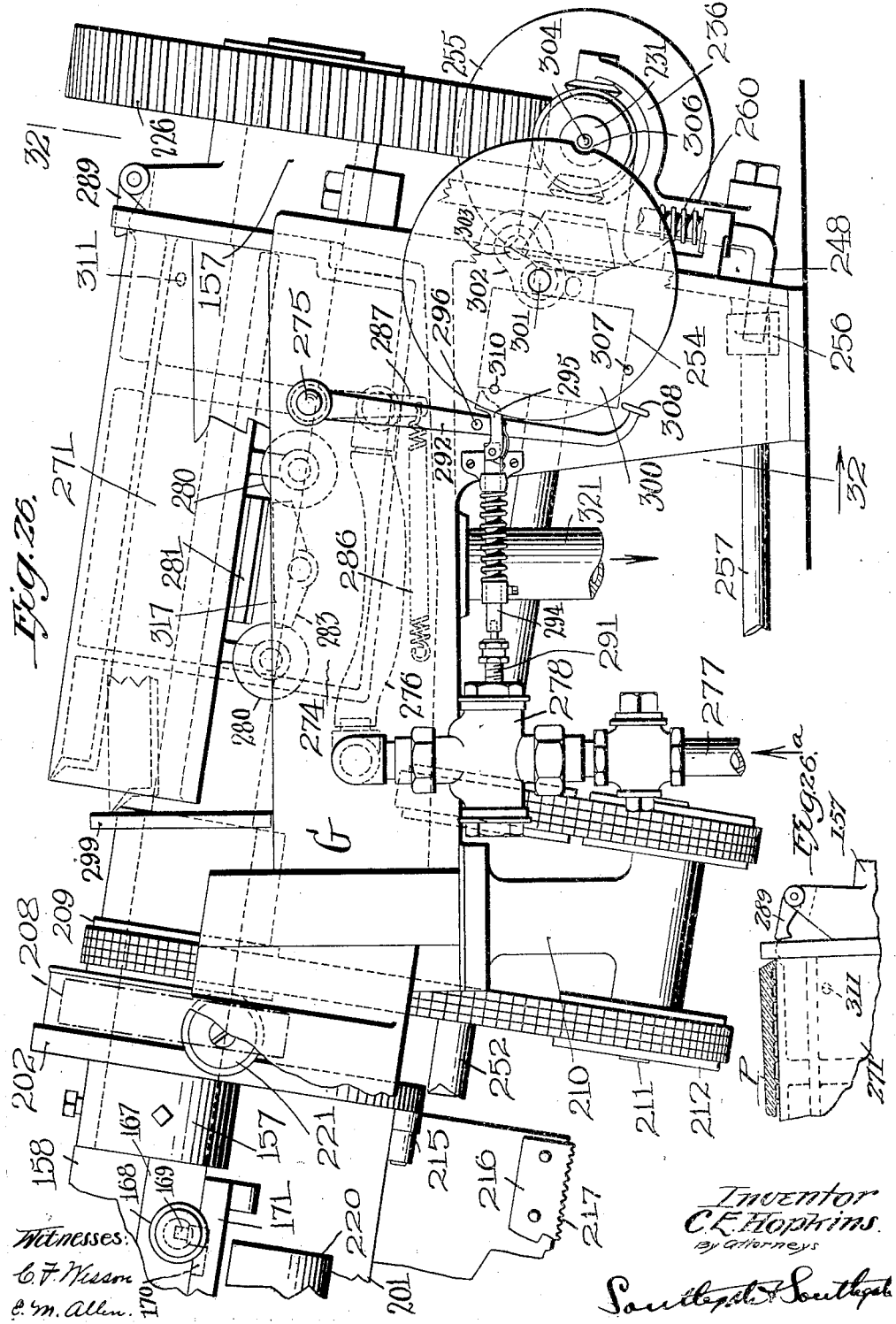

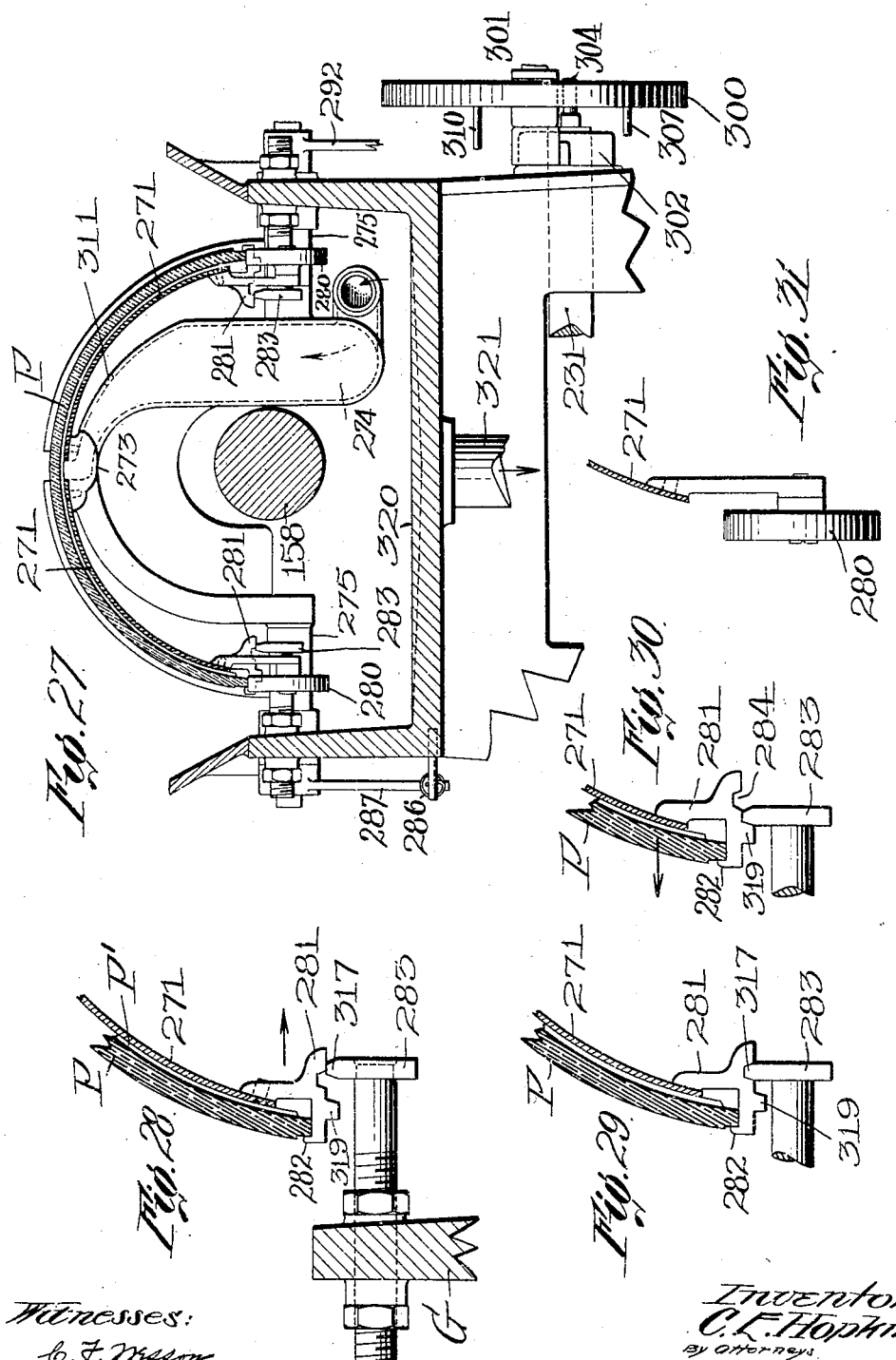

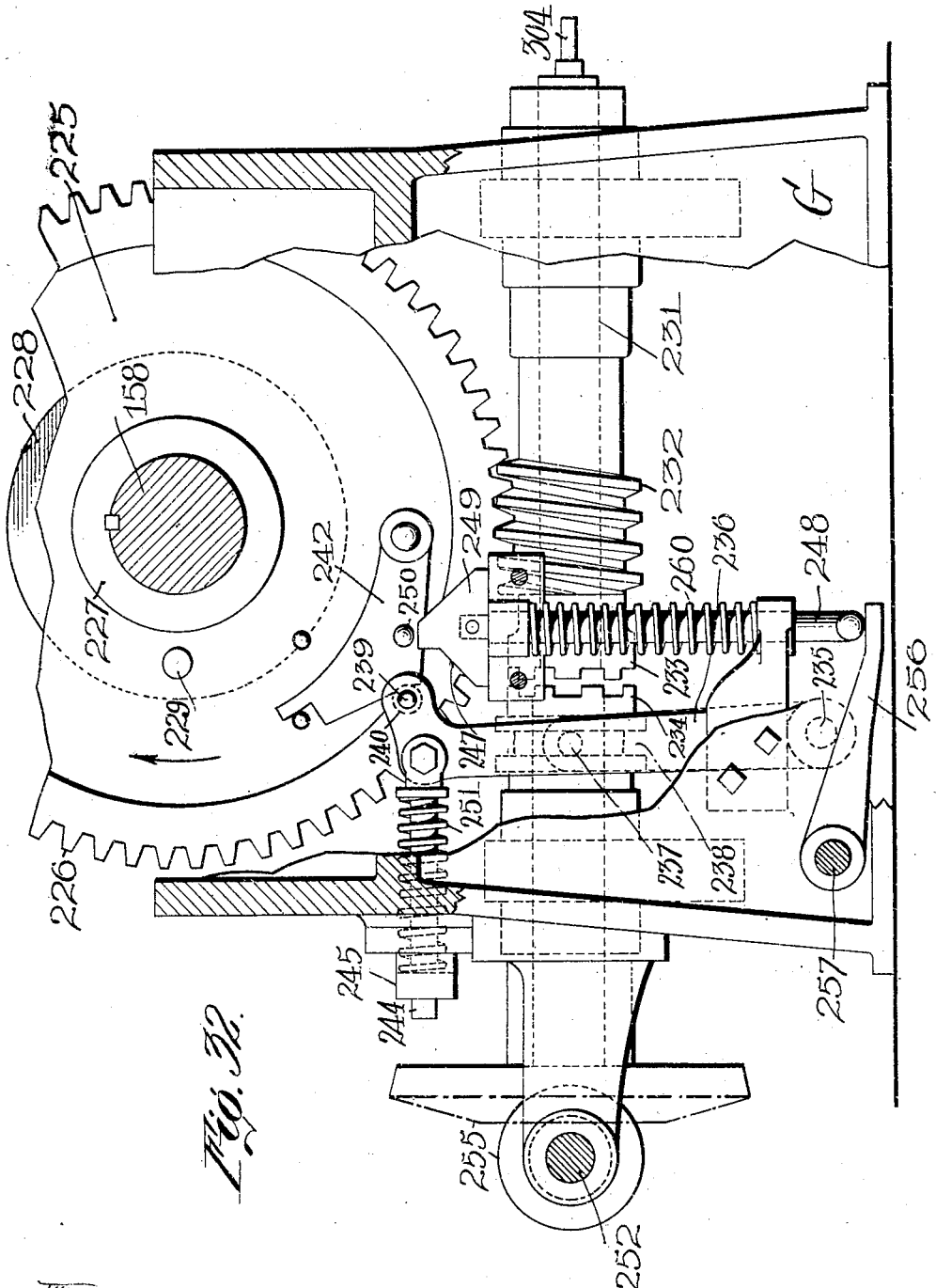

UNITED STATES PATENT OFFICE.

CHARLES E. HOPKINS, OF TAUNTON, MASSACHUSETTS.

MACHINE FOR MAKING STEREOTYPE PRINTING-PLATES.

1,286,323.  Specification of Letters Patent.  Patented Dec. 3, 1918.

Application filed February 25, 1911. Serial No. 610,834. Renewed June 14, 1917. Serial No. 174,794.

*To all whom it may concern:*

Be it known that I, CHARLES E. HOPKINS, a citizen of the United States, residing at Taunton, in the county of Bristol and State of Massachusetts, have invented a new and useful Machine for Making Stereotype Printing-Plates, of which the following is a specification.

My invention is for the purpose of producing semicircular curved stereotype printing plates for use on the cylinders of rapid printing or rotary presses, particularly such as are in common use in producing newspapers, and is designed mainly as a labor saving device whereby one man by manipulating certain handles and levers will be able to produce the stereotype printing plates completely finished, and cooled so they can be handled by the bare hands, in condition to be immediately attached to the printing press cylinder; also to provide means whereby, through the control of the contraction of the curved printing plate during the process of cooling, the operator will be able to produce plates of various curvatures or dimensions from the same casting chamber and further, through the control of the cooling fluid, deliver the plates practically dry and ready to be attached to the press cylinders.

More specifically the invention comprises a practicable arrangement whereby the plate is cast vertically between a stationary back and a movable core in such a way that the core can be turned down from the stationary back to deliver the cast plate therefrom; to provide simple means whereby the plate is automatically lifted from the convex surface of the core when the latter is moved to position for delivery; to provide a construction in which the core is moved from the vertical casting position to a horizontal position and further swung over to an inclined position from which the casting can slide endwise with the aid of gravity; to provide means of a simple character whereby not only are the casting box and core cooled during casting, but also the cooling of the core continues after casting and while it is being swung over to inclined position, and in fact all the time; to provide means whereby the latter cooling operation is caused by water circulating in the core while connected with a water supply system and retained therein if such connection is closed; to provide means whereby matrix clamps on the back can be swung out and in at the proper time so as to clamp the matrix when the casting operation is to be performed, and to unclamp it when required, these means being so constructed that the matrix is released before the cast plate moves out; to provide an improved construction of bottom ring support for supporting the core; to provide means whereby a bevel is cast on one end of the plate close to the type face of the matrix with a clean sharp edge so as to do away with the necessity of mechanical finishing thereof; to provide the movable core with means for forming projections on the cast plate on the concave surface of the riser portion for use in positioning the plate in the finishing mechanism; to provide the top of the mold with a wide opening for the entrance of metal and with means for preventing the over-flow of the metal over the tail-ring and other mechanism; to provide an improved adjustable tail-sheet for the core to overlap the bolster of the matrix so as to prevent metal from entering behind the latter; to provide a construction whereby the tail-sheet can be turned away from the top of the core when the core is turned over out of the casting box; to provide automatic locking means for preventing turning of the core unless the tail-sheet and its ring are in casting position thereon; to provide simple and effective guiding means for guiding the core to and from its position in the back; to provide for supporting the core near its center of gravity so as to have the core so balanced that the thick top end of the stereotype plate cast on it will over-balance it and assist in turning it out of the casting box to its horizontal position, but without a stereotype plate the core will have a tendency to turn by gravity to the vertical position in the back; to provide movable means for assisting in this result; to provide simple and convenient means for automatically locking the core in casting position; to provide this locking means of such construction that the core can be guided into casting position or out, and that after it is in casting position the operating means can be further operated without moving the core so as to permit of the opening of the matrix clamps; to provide matrix clamps with pivoted jaws which automatically open and close; to provide means operated by the movement of the core to positively operate the matrix clamps to release the matrix and swing out of the path of the sides of the stereotype plate on the core; to provide means whereby when the core is moved into the back the side bars are forced solidly against the edges of the matrix supporting back and for positioning the core and alining the edge of the plate lifters in the casting chamber with the edges of the matrix holding jaws of the matrix clamps; to provide means within the control of the operator for closing the matrix clamps and for opening them without turning the core; to provide means for preventing the core being turned into casting position while the matrix clamps are open and for automatically releasing this means when they are closed to casting position; to provide simple and convenient mechanism in alinement with the core when it reaches its final open position for receiving the plate therefrom, shaving the ribs cast on the concave surface of the plate, cutting off the riser, beveling the riser end, gradually lowering and finally dropping the tail cut off, releasing the plate and allowing it to be fed by gravity from the finishing mechanism to a final cooling mechanism; to provide simple and effective means for receiving the plate from the finishing mechanism and cooling it in such a way as to control the contraction of the plate during the cooling process so that plates both of less or of greater diameter can be provided from the same casting chamber; also to provide for controlling the cooling water so that the plate can be delivered dry and ready for the press cylinders.

The invention also involves numerous improvements in details of construction and in mechanism for carrying out the objects elsewhere specified herein. Further objects and advantages of the invention will appear hereinafter.

Reference is to be had to the accompanying drawings in which

Figure 1 is a side elevation of a complete machine constructed in accordance with this invention;

Fig. 2 is a side elevation on enlarged scale partly in longitudinal central cross-section showing the casting position of the parts and the adjacent end of the finishing device;

Fig. 2ª is a similar view showing the casting box partly open;

Fig. 3 is a small detail view on enlarged scale of the trip mechanism connected therewith;

Fig. 4 is a sectional view on the line 4—4 of Fig. 2 of the mold showing the parts for receiving the casting therefrom in plan, but with matrix clamp omitted;

Fig. 4ª is an end view of some of the details thereof;

Fig. 5 is an end view of the core, showing the tail sheet in closed position in full lines, and also showing the open position in dotted lines;

Figs. 6 and 7 are two enlarged vertical sectional views through one side of the core showing the plate lifter before and after it lifts the plate;

Fig. 8 is a central vertical sectional view of the casting box with a cast plate therein;

Fig. 9 is a horizontal sectional view taken on the line 9—9 of Fig. 11, showing the tilted bottom ring in plan;

Fig. 9ª is a longitudinal sectional view of one of the matrix clamps;

Fig. 10 is a vertical sectional view on the line 10—10 of Fig. 4, of the mold and core separated with the tail ring closed and the cast plate delivered over but free from the core;

Fig. 10ª is a section through the core turning shaft of Fig. 10 with the core in an intermediate position;

Fig. 10ᵇ is an edge view of a detail;

Fig. 11 is a side view of the mold showing the matrix holders when the core is moving back into casting position;

Fig. 12 is a horizontal sectional view on the line 12—12 of Fig. 11, on enlarged scale of the one edge of the back showing one of the matrix clamps and matrix holders;

Fig. 13 is a similar sectional view of a part of the same showing the parts in closed position ready to receive the metal;

Fig. 14 is a plan of the shaving mechanism with the arch removed;

Fig. 15 is a side elevation of the plate lifter support thereof;

Fig. 16 is a plan of the cam plate removed from its position as shown in Fig. 4;

Fig. 17 is an end elevation of a stationary cam;

Fig. 18 is a transverse sectional view showing how the cast plate is supported on the lifter;

Fig. 19 is a sectional view on the line 19—19 of Fig. 14;

Fig. 20 is a sectional view on the line 20—20 of Fig. 14;

Fig. 21 is a diagrammatic sectional view of the same on reduced scale showing one position of the parts during the finishing operation;

Figs. 22, 23, 24 and 25 are similar views showing other positions of the same parts;

Fig. 26 is a side view of the cooling apparatus;

Fig. 26ª is a fragmentary detail thereof;

Fig. 27 is a sectional view of the same on the line 27—27 of Fig. 1;

Fig. 28 is an enlarged sectional view on the same line showing how the edge of the plate is held during one period of the operation;

Figs. 29 and 30 are similar views showing other positions of the plate;

Fig. 31 is an end view of one of the rollers for supporting the plate with parts in section; and Fig. 32 is a transverse sectional view on the line 32—32 of Fig. 26.

In order to get a general idea of the invention it may be stated that the drawings, particularly Fig. 1, show a machine embodying the following elements, namely, a melting furnace and pump A of any desired construction for delivering metal in measured quantities to a segmental back B preferably located in vertical position on a base or frame C, also a convex core D constituting with the back the lateral walls of the casting box, but capable of moving out of the back with the cast plate thereon, and delivering the plate to a finishing mechanism E which in turn delivers it to a cooling device F. The base C and the base G of the cooling device support a frame H on which the finishing mechanism is mounted. A motor K is shown for the purpose of operating certain of the parts as will appear hereinafter.

The casting mechanism as shown is composed of the base C upon which is mounted in a vertical position the segmental or concave hollow matrix supporting back B. The matrix supporting back is provided with a chamber having an opening at the bottom in which is connected a water supply pipe 40, for the purpose of keeping the said back cool and thereby assist in rapidly solidifying the stereotype cast. An outlet 41 is located at the top for the discharge of the water. Near each straight edge 42 (Fig. 12) of the back are pivoted improved matrix clamps comprising jaws 56 supported by upright shafts 44 loosely mounted in bearings 45, fixed to the sides of said back. Fastened on the said shafts are short links 46, the movable ends of which are pivotally attached by studs 47 to locking slides 48 having beveled ends 49. Said slides are arranged on the exposed sides of matrix bars 50 and 51 which are pivoted on the said upright shafts by hinges 52, and on the opposite sides of the said matrix bars are reciprocating bolster packing strips 53 and a sheet metal covering 54. Said locking slides and bolster packing strips are held together by studs 55 which operate in slotted holes through the matrix bars. At the opposite edge of the matrix bars 50 and 51 from that by which they are pivoted to the upright shafts, are the matrix jaws 56. They are pivotally mounted on rods 57 and are held normally away from the matrix bars and against the beveled ends of the locking slides by spring actuated plunger 58, extending through the edges of said bars and engaging the adjacent sides of the jaws. The matrix bars are beveled off at their outer edges at 59 to accommodate this motion of the jaws.

Mounted on one of the jaws 56 are a series of tubes 60, which are closed on one end and have within spring actuated plungers 61, each of which plungers extends through an opening 62 leading into a slot 63 formed in the said jaw for the entrance of the matrix bolster. These plungers are positioned so as to engage the edge of the matrix bolster as the matrix clamps are turned into closed position against the edges at the back and the plungers 61 will push the matrix toward and solidly in the slot of the opposite jaw. By this arrangement of the matrix jaws 56, the act of turning the shafts causes the matrix bars 50, 51 to turn toward, and their bolster packing strips 53 to engage, the straight sides 42 of the back, and a further turning movement of the shaft moves the beveled ends 49 of the locking slides 48 toward and over the hinged jaws 56. This is a cam motion which causes the said jaws to turn on their hinges. At the same time the bolster packing strips 53 and covering strips 54, on the opposite sides of the matrix bars, move inwardly until the strips 53 engage the bolster of a matrix positioned in the matrix supporting back. The matrix jaw opposite the one with plungers is provided with a lip 64 (Fig. 9) which extends in the casting chamber and forms a groove along that straight edge of the cast for a purpose hereafter described. The matrix jaws 56 are of a length equal to the type face portion of the matrix. But the packing strips 53 are the full length of the matrix which includes the bolsters. The two matrix clamps as just described are connected by short arms 67, (Fig. 4) attached to the lower ends of the upright shafts and a rod 68, extending across from one to the other of said arms; through these links and rod both matrix clamps move in unison. The shafts are oscillatable by means to be described hereinafter.

At the bottom of the casting box and internally alined with the concave surface of the matrix supporting back is a concavo-convex semi-circular ring 70 (Figs. 8 and 10). It is fastened to a support 71, which is mounted on a rock shaft 72 extending across and pivoted in bearings in the base. The ring 70 has its top edge beveled downward at 70ª toward the concave side and its convex side formed with a recess 73 in which the lower bolster of the matrix enters when the ring is turned and engages the concave surface of the matrix supporting back as hereafter explained. However, the bevel is formed only on that portion of the ring extending between the matrix jaws, the balance being flat so as to engage the lower end of said jaws and co-acting side bars, hereafter described. This rocking ring 70, and its support are normally held at an angle away from the back and against a stop 74 by a spring 75 (Fig. 9) fixed at one end to a collar on the shaft 72 and at the other end to the frame. To the ring 70 are fixed matrix supports, 76, which enter recesses 77 in the lower edge of the matrix supporting back and close into said recesses when the ring is turned into position against the concave back. The concave surface of the matrix supporting back is provided with a raised rib 79 extending the length of the curve and located so as to support the lower bolster of a matrix. The top portion of the rib is made convex so as to fit the back curvature of the bolster where the said bolster joins the type face. The recess 73 of the end ring 70 is provided with a like concave at the top so as to fit the front of the opposite side of the bolster and the top edge of the said ring is made slightly flat. By this means I am able to cast the bevel close to the type face of the matrix and at the same time produce a clean sharp edge on the cast and thereby do away with the necessity of any mechanical finishing of that curved edge of the stereotype plate.

Supported on tracks 80 on supports 78 on the base C, and in front of the concave side of the matrix supporting back is the semi-cylindrical core D, which is made to oscillate or turn from about 9 degrees beyond horizontal to a vertical position within the concave back and return. Guides 81 on the core engage the outer surfaces of the tracks. The core, like the matrix supporting back, is made hollow, and is provided with a water distributing chamber 82, at one end for the purpose of equal distribution of cold water as it enters the cooling chamber back of the casting surface of the core. The water is supplied from the pipe 40 to the distributing chamber through a flexible tube 83 connected to an opening leading into the said chamber. Near the top of the core is a discharge opening in which is connected a pipe 84 and to which pipe is attached a flexible tube 85 connecting in turn with a stand pipe 86, located at one side of the base; by this means the cooling water freely circulates, and owing to the stand pipe, the core is constantly kept filled with water which cools the core and thereby quickly solidifies the cast.

Suitable valves 87 for regulating the flow of water through both the core and back are provided and positioned so the operating handles are located directly in front of the operator and of the base C.

In the face of the core D are made the usual recesses 88 which form ribs P' on the concave side of the cast plate P, and at each side and near the top of the core recesses 89 are made for the purpose of forming projections P² on the concave surface of what is called the riser portion of the cast plate. These projections are for use in positioning the cast in the finishing mechanism E, hereafter described.

The top of the core is beveled at 90 so as to form a wide opening for the entrance of metal and to prevent the overflow of the metal over the tail ring 97. The tail P⁴ is cast in a recess (Fig. 29). A recess 92 is made along the bevel on the upper edge of the core beneath which a receiving pan 93 is located to catch any overflow and prevent it running on the core turning mechanism.

Attached to each of the straight sides of the core D, (Figs. 6 and 11) by studs 94 are plate lifting bars 96 on which are mounted lifter plates 95, which form with the hinged matrix jaws 56, the edge walls of the casting chamber. Hinged to the upper end of one of the plate lifting bars is the adjustable tail ring 97 with arms 98 extending lengthwise of the core, shown closed in Fig. 10. This ring and arms form with the thin metal sheet 99 fastened thereto, what is known as the pouring or tail sheet, which when in position in the back overlaps the top bolster of the matrix, thereby preventing metal from entering behind the matrix, when pouring a cast. To the opposite side of this ring from the hinge is fixed a handle 100 by which the ring can be turned away from the top of the core, when the core is horizontal, and against a support 101 on the finishing frame H (Figs. 1 and 5). During this turning motion of the ring away from the core a hook 102 fastened to a hinge 104 of said ring moves under a catch 103 attached to the frame of the finishing part of the machine, (Fig. 14) thereby locking and preventing the turning of the core, unless the ring is in casting position on the core. A spring catch 105 is provided to hold the ring in position on the core. I also provide a wedge 106 having a lower slanting surface resting on the top slanting surface of a fixed cleat 107. The wedge is fixed by a bolt passing through a slot 108 in the wedge, so that it can be adjusted to raise and lower the tail sheet 99 held in the tail ring 97.

Having described the matrix supporting back, its coacting matrix clamps, bottom ring and core I will now describe the mechanism through which the different movements are made.

Fastened to a seat 110 formed on the concave side of the core is a core turning bracket 111, having a long slot or cam groove 112, which operates about a roller 113, mounted on a shaft 114, extending between the track supports. When the outer end of the core is lifted by hand the roller 113 and the cam 112 control the turning movement thereof. The seat on the frame C for the supports 78 of the core turning bracket 111 is provided with an opening 109, and between these supports and within the opening is pivoted a roller carrying lever 115. This lever has extensions through which a short shaft 116 passes, on which shaft rollers 117 are mounted so as to rest upon the tracks 80 and thereby form a rolling connection between the said tracks and core. The roller lever 115 extends beyond the rollers and its lower portion is provided with a long slot 118 which can move over and about a roller 119 mounted on a short stud 120 fastened in one of the track supports. This arrangement of the rollers on a pivoted lever is for the purpose of supporting the core near, but not on, the center of gravity. The object is to have the core so balanced that the thick top end of a stereotype plate cast upon the core will over balance the core and assist in turning it to horizontal position, but without a stereotype plate the core will have a tendency to turn toward the vertical position. This over balancing is greatly assisted through the rollers moving back and forth beneath its pivot point 114 as the core is moved on its rollers along the tracks.

In the horizontal position the core is supported by the rollers 117, engaging the tracks, but to move it to vertical position it is necessary to seat the bottom end within the ring 70, on the ring support 71, located below the matrix supporting back, whereupon the center of support changes from the pivot of the roller carrying lever to the pivot 72 of the end ring 70. Upon a further turning movement the rollers 117 swing free from the tracks and the core, now resting on the end ring support, completes its turning movement into casting position within the matrix supporting back.

For the purpose of locking the core in casting position, a cam grooved plate 122 is mounted on the shaft 114 which extends through and between the track supports 78, and a roller 124 mounted upon the lower end of the core turning bracket 111, enters the cam groove formed in the grooved plate 122, when the core becomes seated within the bottom ring 70. The groove of the cam 122 is so shaped, that by turning an operating handle 125 on the end of the shaft 114, it will move the core into casting position, or out. For the purpose hereafter described the cam groove is shaped so it may be turned further without moving the core after the core is in casting position.

Attached to each end of the shaft 114 are plate lifting cams 126, which engage the plate lifter bars 96, as the core is being turned to horizontal position and, as the turning continues, force the lifter bars up and thereby lift the stereotype plate free from the surface of the core and support it in alinement with the finishing mechanism hereinafter described.

The opposite edge of the cam plate 122 is provided with a face cam 128, which operates a combination of levers, each time the core is turned to horizontal position. These levers in turn cause the matrix clamps to release the matrix held within the matrix supporting back and also cause the clamps to swing on their pivots back and out of the path of the sides of the stereotype plate carried by the core as the core is turned out of the casting back. The mechanism which I show to cause this movement consists of a rock arm 130, pivoted near its center on one of the supports 78 and in a vertical position between the tracks. The upper end is provided with a roller 131 which engages the face cam 128 and is always held in engagement by a spring 132. To the lower end of the rock arm 130 is pivoted a pawl 134 which engages, when opening the matrix clamp, a pivoted arm 135 (Fig. 3). But when the core is turned into the back the pawl passes over the said pivoted arm 135, the pawl being provided with a beveled tooth 136 for that purpose. The pawl normally rests on a pin 137 on the rock arm 130. The arm 135 is fastened on a short shaft 138, supported in bracket 139, attached to the underside of the base C. On the opposite end of the shaft 138 is a like arm 139ª, the top end of which is pivoted to one end of a link 140. The opposite end of the link is pivoted to the upright arm of a three armed rock piece 141. A second link 142 connects the said rock piece to one arm 143 of a bell crank fastened on the lower end of one of the matrix clamp shafts 44. One of the arms 67 constitutes the other arm of this bell crank. Through these connections the matrix clamps are made to open, but owing to the shape of the cam groove in 122, operated by the core locking handle, the core remains stationary and in casting position during this operation of opening the matrix clamps.

Attached to the plate lifters 95 on the core are lifter bar stops 145, which when the core is being turned into casting position engage the locking slide members 48 of the matrix clamps, forcing the core plate lifters back against the heads of the studs 94, and then force the jaws 56 from the full line position in Fig. 12 to the position in Fig. 13 to force the casting bars solidly against the edges of the matrix supporting back, and also properly position the core and aline the edge of the plate lifters within the casting chamber with the edges of the matrix jaws 56, of the matrix clamps. For the purpose of closing the matrix clamps, I provide a foot pedal 146 fastened to one end of a vertical rod 147, operating vertically in a bearing of a bracket 149

148 fastened on the interior of the base C. The opposite end of the rod is pivoted to one of the horizontal arms of the three armed rock piece 141 previously referred to. To the third arm, also horizontal, I attach a like foot pedal 149 in like manner for the purpose of opening the matrix clamps, if desired, without turning the core.

Fastened on the short shaft 138 mounted in a bracket fastened to the underside of the base, is a third rock arm 150, which carries a spring actuated catch 151, positioned so as to be in the path of the roller 152, which is mounted on the lower end of the core turning bracket 111. When the core is turned to horizontal position, (the matrix clamps being in the open position,) the roller compresses the catch 151, and as the roller passes by the catch is forced forward and in the path of the roller, thereby locking or preventing the core being turned into casting position while the matrix bars are open, but the movement of the matrix clamps into the closed or casting position causes the arm 150, with the spring catch, to rock out of the path of the roller 152, which releases the core.

Having described the casting mechanism of my invention I will now explain the mechanism shown for shaving the ribs P' cast on the concave surface of the stereotype plate P, the mechanism for cutting off the riser and beveling that curved end, and the means for conveying the now finished stereotype plate from the finishing mechanism to the cooling mechanism F, all represented in a general way by the letter E (Fig. 1).

Mounted in three bearings 157 (Fig. 14), on the frames H and G is a longitudinal main shaft 158 operated from the motor K as will be explained hereinafter. Fastened to the main shaft and within the arch is a shaving knife 159 which extends lengthwise and is of a length slightly longer than the said arch, the said knife being so positioned as to engage and smooth off the faces of the ribs P' cast on the stereotype concavity.

Positioned on the main shaft beyond the arch are adjustable plate stops 160 and 161 (Fig. 20) which engage ledges P² cast on the side of the concavity of the riser of the stereotype plate and stop said plate in proper position when moved into the arch, from off the core, on which it has been cast and hold the said plate from further lateral movement until the lifters have raised it against the dome of said arch. The stop 161 is spring actuated because the plate enters the arch out of horizontal alinement with the axis thereof and has to be moved sidewise and into axial alinement when lifted up into the dome of said arch to position to be shaved, as will appear hereinafter. The main shaft is caused to make one revolution each time a trip 259 is pushed down and released to operate a clutch 233. During the revolution of the main shaft a stereotype plate is shaved and the riser cut free from the said plate, by tools carried by the said shaft, which engage the stereotype plate when positioned in the stereotype plate supporting arch 164, which is mounted on the top of the frame and axially alined with the said main shaft.

Beneath each straight side of the arch 164 are mounted supporting and guiding rollers 165 and beyond the arch but carried by the main shaft by reciprocating studs 166 operating in bearings 167 are a group of three rollers 168 (Fig. 16). These are caused to move toward or away from the axis of the said main shaft by pins 169 on each stud engaging in grooves 170 cut in a cam plate 171. The latter moves axially on the said shaft and is operated by a stationary face cam 172 fastened to the upper bearing 157 of the main shaft, through a connecting rod 173 a cam arm 174, and a spring 175. (See Figs. 14, 16, 17 and 21.) The reason for making the rollers move toward the axis of the main shaft when the shaft starts to revolve is to move the rollers from under the edges of the riser of the stereotype plate resting upon the said rollers within the arch, the movement being accomplished by the end of the cam arm, 174 moving out of the recess in the fixed face cam. Upon the finish of the revolution of the main shaft the spring 175 mounted upon the connecting rod moves this rod to the left in Fig. 14 as the arm 174 enters a depression in the cam 172. This carries the cam plate 171 to the left and pushes the rollers out, and the rollers become a support for the stereotype plate as it moves out of the arch and toward the cooling mechanism.

Beneath one side of the supporting arch is a mechanism for lifting the stereotype plate into position against the arch dome. As will be seen by the drawings the rollers 165 which support the stereotype plates are located out of horizontal alinement with the axis of the arch and a recess is formed beneath one side of the arch. At one side of the arch beneath this recess double flanged rollers 177 are located. The purpose of these flanges is to guide the stereotype plate as it moves into position within the arch and over a plate lifter 180 (Fig. 15). This plate lifter moves in camways 181 fastened to the frame at an angle and as the lifter rises, it also moves toward the axis of the arch and a lip 182 (Fig. 18) formed on the seat 183 of the lifter engages in the groove P³ cast in the edge of the stereotype plate as the lifter moves upward and forces the said stereotype plate to move at the same angle as the lifter so that the plate is moved solidly against the opposite side of the arch simultaneously with its rise. Upon the return movement, the lip 182 engages in the groove formed on the stereotype plate, pulls the plate back into position between the flanges of the rollers and a further movement of the lifter downward disengages the lip from the groove.

Pivoted by studs 185 fastened in the lifter are spring rods 186 which operate through a rock roller 187 pivoted to levers 188 mounted on a shaft 189 supported by bearings on the frame. Mounted upon the rods are adjustable compression springs 190, the purpose of which is to compensate for any variation in the circumference of the stereotype plate. To one end of the shaft 189 is fastened a lever arm 191 to which is pivoted a link 192 by one end, the opposite end engaging with a cam 193 fastened to the main shaft. For the purpose of holding this arm 191 in position one end of a link 194 is pivoted to it, the opposite end being pivoted to a cross piece of the frame. The cam roller rests in a recess in the side of the cam and upon turning the main shaft the recess moves from over the roller, the roller thereby being depressed which act causes the lifter to rise. The return movement is accomplished by gravity.

Having described the mechanism for lifting the stereotype into the dome of the arch and shaving its ribs I will now describe the riser separating and beveling mechanism and means for conveying and ejecting the riser from the machine, reference being had especially to Figs. 20 to 25.

For the trimming operation I employ a planetary mechanism in which is operatively mounted a revolving circular saw 200 having one of its edges beveled for the purpose of forming a bevel on that edge of the stereotype plate from which the riser has been separated.

This planetary mechanism comprises a bracket 201 fixed to the main shaft by an extension 202 at one end. The other portion is formed into a convex-concave shell with both ends closed. Extending through the shell and mounted in suitable bearings is a short shaft, 203 to one end of which is attached the beveled edge saw 200, with its bevel facing adjacent to the lower end of the stereotype plate supporting arch. Facing that closed end it is shaped so as to pass outside of and over the end of the arch. To the opposite end of the shaft 203, which extends through that end of the shell is keyed a gear wheel 204, which meshes with a gear 205 mounted on a stud 206 fastened in the bracket 201. Mounted on the main shaft is another gear 208, which in turn meshes with the gear 205. Also mounted on the main shaft is a chain drive gear 209. Beneath the frame is a bracket 210 in which is mounted a shaft 211, having a chain drive gear 212, fastened on each end and in brackets 213 at the back and alined with the frame is the driving shaft 158, which through the chain connections operates the two sets of chain gear drives and the bevel edged saw at a high rate of speed.

A portion of the shell of the saw bracket 201 is made loose and attached by hinged joints 215, to the fixed part of the said shell and to the loose edge of the hinged part of the shell is connected a flat piece 216 of steel having its extending edge formed into short teeth 217 (Fig. 1) for the purpose of holding the riser after it has been separated from the stereotype plate as hereafter shown.

Fastened on the main shaft 158 is a semicircular riser support 220, which is so positioned that when the shaft turns it will pass under the riser of the stereotype plate, and support the riser after it is separated by the saw from its plate. During the operation of sawing away the riser from the stereotype plate the planetary shell 201 passes over the surface of the riser until the saw has finished the cutting operation when the separated riser now resting on the support begins to turn with said support and planetary shell, but as the revolution continues the loose riser has a tendency to slip ahead, which slipping engages the teeth in the hinged portion of the shell. As the turning continues the weight of the riser is transferred from the support to said teeth of the hinged portion of the shell and is carried ahead by said shell until the pivot point of the hinge has been passed when the said shell tips over on its hinge and allows the riser to drop free from its conveying mechanism. See Fig. 25.

It will be seen that the concavity of the saw bracket 201 serves the purpose of a saw dust receiver. The dust is carried along between the shell and the riser until the said riser is ejected by the opening out of the hinged shell whereupon the saw dust escapes.

Mounted upon the saw bracket opposite the saw is a plate supporting roller 221. Alined with the rollers on that side of the machine and mounted in the frame opposite is a similar roller 222, which with the rollers within the arch and upon the main shaft form conveying means for the discharge of the stereotype plate directly on the cooling saddle 270 the end of which is in alinement with said rollers.

Having described the construction and operation of the shaving and trimming mechanism I will now describe the mechanism shown for operating the same. See Figs. 26 and 32.

Keyed to the lower end of what I call the main shaft, that is, the main shaft of the finishing device, is a large worm gear 225 which for the purpose of preventing accident is made in two parts, one of which is a toothed rim 226 mounted upon a hub 227, which has a broad flange 228 facing the said ring. The rim and hub are made to travel together by a breaking pin 229 positioned in a hole through both members. The reason for making the gear in two parts is to prevent accident in case the main shaft should for any reason be prevented from moving with the gear in which case as constructed the pin 229 would be cut in two and no other damage done.

Positioned below the worm gear and loosely mounted on a cross shaft 231, so as to mesh with the gear teeth is a worm 232. One end of it is formed with a clutch jaw 233. Mounted on the same shaft and facing the jaw 233 of the worm is a sliding jaw 234 which is made to revolve with the shaft. Pivoted below this jaw on a stud 235 fastened in a leg of the frame is a shifting yoke 236 carrying projections 237 which engage in a groove 238 made around the sliding jaw member. One of the arms of the yoke extends upward and mounted on a stud 239 in said extension is a small roller 240. To the face of the worm gear 225 is pivoted a latch 242 positioned so that after each revolution of the worm gear it will engage the roller 240 and force the jaws of the sliding clutch out of engagement with the jaws of the worm, and hold them disengaged until the latch is moved on its pivot out of engagement with the yoke extension roller 240. The yoke at all times is held toward the engaging position by a compressed spring mounted on a rod 244 operating through a bracket 245 on the frame, the rod being attached to the yoke extension 236.

A trip mechanism for disengaging the latch 242 is located so as to push the said latch up and free from the yoke extension roller which consists of an upright rod 248, operating in bearings on a leg of the frame and carrying on its top an extension 249 with a beveled side 247. This extension when pushed up a short way engages with a pin 250 on the side of the latch which raises said latch and releases the yoke. Then a spring 251 will move the same which in turn advances the sliding jaw into engagement with the jaw on the worm.

It must be understood that the cross shaft 231 is revolved continuously by the driving shaft 252 to which it is connected by beveled gears 255. The driving shaft is driven by any suitable source of power and connection, the motor K, belt, and pulley 254, on the shaft 252, being shown for this purpose.

The means employed for operating the trip rod 248 consists of a short lever 256, fast on a rod 257, operating in bearings and extending lengthwise of the machine and located at the back side but beneath the frame. To the opposite end of this rod is fastened an arm 258, (Fig. 4) which extends toward the front side of the machine. To the base C of the casting mechanism is pivoted on a stud a foot pedal 259 having an extending arm which engages the arm on the aforesaid shaft.

By this mechanism the operator by pushing the pedal down can force the pawl out of engagement with the yoke extension and thereby start the machine, but in case he wishes to stop the machine for any reason before the trip acts, a second push downward will force the beveled edge of the extension of the cam 249 up into engagement with the yoke extension roller 240 and force the jaws of the clutch out of engagement. A spring 260 is mounted on the upright trip rod for the purpose of holding the said rod down and out of the path of the latch when the machine is in operation, and returning the pedal to its normal raised position.

Having explained the casting and finishing of the curved stereotype plate I will now describe the improved flexible cooling and drying mechanism employed, and explain how by controlling the contraction of the stereotype plate during the cooling process I am able to produce plates of both less or greater diameter from the same casting chamber, also how by the control of the cooling water I can produce the plate dry and ready for the press cylinders.

Curved stereotype plates, such as are used in producing newspapers, are of a semi-circumference equal to the length of the printed matter of a newspaper page, and vary in diameter from $13\frac{1}{2}$ to $16\frac{1}{2}$ inches.

It is often found that although the printing faces of two different makes of web perfecting presses are the same yet the cylinders may vary in diameter an eighth of an inch, more or less, the difference being in the margins or space between the two printing halves of the circumference of the cylinders which form the top and bottom blank space or margins of the paper.

Owing to this variation it has heretofore been necessary to cast the plates in machines for each size, and again owing to there being a large variety of sizes of presses between the $13\frac{1}{2}$ and $16\frac{1}{2}$ (about 20) it has been considered impracticable to carry casting and finishing machines, in stock. These difficulties I am now able to overcome.

I find that an average sized curved stereotype plate will suddenly contract about $\frac{1}{2}''$ in diameter when the cooling water engages its concavity, and as the cooling advances from the concave side through to the exterior the plate will slowly contract on the outside and counteract the interior contraction, and if left perfectly free the plate will resume its normal curvature. However if the curved plate is supported in a manner so its straight edges are held against axial contraction during the cooling of the interior surface it will nevertheless contract on the exterior and through this contraction cause the straight edges of the plate to draw away from its axes and thereby become of a larger diameter than when cast. By utilizing and controlling this contraction I am able to produce plates of all sizes from four sizes of stock machines.

To accomplish this control of the contraction I have made the cooling saddle 270 (Fig. 14), with flexible sides or wings 271 (Figs. 26 to 31), arranged so as to contract or expand with the plate during the cooling operation, the wings 271 are composed of spring metal, and are normally of a curvature slightly smaller, than the diameter of the concave face of the finished ribs P' on the interior of the stereotype plate P. They are fixed to the sides of an overflow outlet 273 of a water distributing chamber 274 which is supported by pivots 275 on the frame G. The water chamber 274 is connected by a flexible tube 276, to a supply pipe 277 and a water controlling valve 278.

At each straight side of the wings are mounted rollers 280 for supporting the stereotype plate as it is delivered by gravity from the finishing mechanism. Also mounted on each straight side of the wings are brackets 281 (Figs. 27 to 30), which extend beneath the edges of the stereotype plate and have a lip 282 extending up so as to engage the outside edge of the stereotype plate. Beneath the wing brackets and supported by the frame are adjustable stops 283 which engage grooves 284, in the underside of the wing brackets when the stereotype has contracted or expanded the required amount as hereafter described.

The pivoted cooler, plate rollers, and brackets are normally held on the same angle as the main shaft of the finishing mechanism by a spring 286 attached to an arm 287 fast to the pivot 275, and a pivoted latch 289, is arranged to hold it at that angle during the delivery of the stereotype plate, but as the said plate positions itself by sliding down over the rollers from the finishing mechanism the beveled end of the plate engages the said latch and lifts it up (Fig. 26). This releases it from engagement with the cooler whereupon the cooler and plate will turn to horizontal position owing to the greater portion of the stereotype plate being beyond the pivot point.

The balanced valve 278 is positioned in the water connections so that its plunger 291 can be operated by a lever 292 attached to the pivot 275, of the cooler. To one end of the plunger is fastened a rod 294, operating in a bearing. It is provided with a spring actuated latch 295 in the path of a pin 296, positioned upon the lever 292 so that when the cooler turns on its pivot the pin engages the latch and opens the valve allowing the water to flow up into the cooler water distributing chamber and overflow between the hot stereotype plate and flexible wings. As the outlet for the water is confined to the space between the wings 271 and concave face of the stereotype plate, which space is less in cross section than the inlet, the water will be held under pressure against the stereotype plate and drive ahead any steam that may form thereby causing very quick action in cooling the stereotype plate. A stop 299 limits the rocking of the saddle.

For the purpose of stopping the flow of water before the stereotype plate is entirely cold and allowing it to drain free from the plate so that the heat remaining will evaporate any moisture remaining, any desired construction can be used as for instance, a valve which opens automatically in a given time, but I have shown a friction driven timing mechanism composed of a wheel 300, mounted on a stud 301 on an arm 302. This arm is pivoted to the frame G, by a stud 303. This wheel is intermittently driven by a small pin 304, axially mounted on the end of the worm cross shaft 231. Normally facing this pin is a recess 306, formed across the face of the wheel. To the side of the wheel is fixed a pin 307 which is engaged by a projection 308 formed on the lower end of the arm 292, and positioned so that as the cooler turns to horizontal position it will cause the said projection to engage the pin and turn the wheel ahead so that pin 304, normally revolving in the recess 306 engages the face of the wheel 300, and causes said wheel to make one revolution. At the end of the revolution a second pin 310 engages and trips the valve plunger latch 295, which action causes the valve to close and the flow of water to stop. A drip opening 311 is positioned near the over flow of the cooler which allows all water above the said drip to escape so that when the stereotype plate is being lifted, (which action allows the cooler to be turned by its spring into alinement with the main shaft and in position to receive the following stereotype plate,) there is no danger of splashing the stereotype which is now cooled and dried.

By this combination of water control I not only require less water, as by actual test a plate can be sufficiently cooled after a water contact of three seconds, and a draining and evaporating lapse of three seconds more, but also I succeed in cooling the stereotype plate so it can be removed from the cooler by the bare hands. This regulation of the water dispenses with brushes or any other means of wiping the plate dry as has been the practice heretofore.

During the cooling operation, as stated, the stereotype plate contracts first on the interior and then, as the cooling advances through the plate, on the exterior. This is due to the cooling water engaging the concavity of the stereotype only.

The means employed for controlling the contraction as previously stated comprises adjustable stops 283 which engage the brackets 281 attached to the flexible wings of the cooler, the stereotype plate being held against the wings by projections 282 on the bracket overlapping the straight edges of the stereotype plate. So if it is desired to reduce the curvature the adjustable stops are axially moved to the diameter desired so when the hot plate rolls down over the cooler and trips the latch 289 the cooler turns on its pivot until the groove 284 of the bracket 281 engages the top of a lip 317 (Figs. 28 to 30), of the adjustable stop. The act of tipping the cooler having opened the valve, the water rushes into contact with the concave side of the stereotype plate which causes the inside of the stereotype plate to contract, thereby reducing the diameter. This causes the wings carrying the grooved bracket to move axially inward until the groove 284 is over the lip 317 of the adjustable stop, whereupon the weight of the stereotype plate causes the cooler to turn on its pivots. This allows the lip to enter and engage the groove thereby holding the stereotype plate and wings against any further flexing of the stereotype plate in either direction, and thereby leaving the stereotype of a less diameter than when cast. To cause the stereotype to be of a greater diameter after cooling than when cast, the adjustable stop 283 is moved axially out to the desired diameter. If the full limit of expansion is required the stop is moved so it will engage the projection 319 on the lower side of the bracket 281 which will prevent any interior contractions, but as the exterior cools the contraction on the outer side will cause the stereotype plate to open out until the lip of the adjustable stop engages the groove as in the opposite operation. However if a lesser expansion of the diameter is desired the stop should be moved out less, then the action will be, first an interior and closing-in contraction which will cause the projection 319 on the bracket to engage the stop 283, and upon the exterior contraction taking place the stereotype plate will expand until the lip of the adjustable stop enters the groove of the bracket and resists further expansion of the diameter of the stereotype plate. If the plate is cooled on the exterior instead of on the interior the process will be modified accordingly.

Beneath the cooler a sink 320 is formed for catching the waste water which sink is provided with a pipe 321 for carrying the water away.

While I have illustrated and described a preferred embodiment of the invention I am aware that many modifications can be made therein by any person skilled in the art without departing from the scope of the invention. Therefore I do not wish to be limited to all the details of construction herein shown and described, but what I do claim is:—

1. In a stereotype plate casting apparatus, the combination of an upright mold member, and a bottom ring having a recess around the edge thereof for receiving the bottom of the matrix, and a projection at the top of said recess for holding the matrix just above the bolster thereof.

2. As an article of manufacture a bottom ring for a stereotype plate casting apparatus having a beveled surface provided with a projecting edge in position to come close to the type face of the matrix over the bolster thereof.

3. As an article of manufacture, a bottom member for a stereotype plate casting box, adapted to close the bottom of the mold cavity and having projections extending therefrom for supporting the matrix while being positioned in the casting box, said projections being in position to come outside the casting box when assembled.

4. In a stereotype plate casting apparatus, the combination of two separable members, together constituting when in contact, the lateral walls of a casting box, with a bottom member adapted to close the bottom of the mold cavity and to assist in supporting one of said separable members, said bottom member having projections extending therefrom for supporting the matrix while being positioned in the mold, one of said separable members having recesses for receiving said projections when the parts are closed together.

5. In a stereotype plate casting apparatus, the combination of separable members constituting the side walls of a casting box, with a pivoted bottom ring for receiving and supporting one of said separable members and moving with it into casting position about its pivot.

6. In a stereotype plate casting apparatus, the combination with a casting box, of a bottom ring therefor pivotally mounted below the bottom of the casting box to swing toward and from casting position, and having means for receiving the edge of a matrix, and means for supporting the edge of a member of the casting box.

7. In a stereotype plate casting apparatus, the combination of a fixed upright back, a core movable into the back and also movable into a position transverse thereto, a tail sheet pivoted on the core at the side thereof on an axis longitudinal of the core, and means for preventing the core from moving into the casting box when the tail sheet is in open position.

8. In a stereotype plate casting apparatus, the combination of a back, a core movable into and out of the back, a tail sheet movable with the core, the tail sheet being capable of moving away from the core, and means for preventing the core from moving into the casting box when the tail sheet is in open position.

9. In a stereotype plate casting apparatus, the combination with a segmental back, of a convex core, said core extending up to the top of the back, having its upper edge beveled to provide a pouring opening, and having an overflow recess for metal along the top of said beveled edge communicating with it and extending from the convex side thereof to the concave side.

10. In a stereotype plate casting apparatus, the combination with a segmental back, of a convex core, said core having an overflow recess along the top thereof, and a guard plate on the concave side of the core to catch metal from said recess.

11. In a stereotype plate casting apparatus, the combination of a back, and a matrix clamp swingingly mounted thereon and having a swingingly mounted matrix jaw and a reciprocable bolster packing strip adapted to grip a matrix between them when the clamp is closed into casting position.

12. In a stereotype plate casting apparatus, the combination with a back, of a matrix clamp pivotally connected therewith, comprising a matrix jaw, an independently reciprocable locking slide for swinging the matrix jaw, and means for reciprocating the locking slide.

13. In a stereotype plate casting apparatus, the combination with a back, of a matrix clamp connected therewith, comprising a matrix jaw, a locking slide for operating the matrix jaw, means for reciprocating the locking slide, and a bolster packing strip connected with said locking slide and operating therewith.

14. In a stereotype plate casting apparatus, the combination with a back, of a matrix clamp connected therewith, comprising a matrix jaw, a locking slide having a cam surface for engaging the matrix jaw and moving it toward the back, and means for moving the locking slide.

15. In a stereotype plate casting apparatus, the combination with a back, of a matrix clamp pivotally mounted with respect thereto, and comprising a matrix jaw pivotally mounted and provided with a spring-pressed plunger adapted to engage the edge of a matrix.

16. In a stereotype plate casting apparatus, the combination with a back, of a matrix clamp pivotally mounted with respect thereto, and a spring-pressed plunger adapted to engage the edge of a matrix.

17. In a stereotype plate casting apparatus, the combination with a curved back, of a shaft arranged longitudinally near each of the opposite edges thereof, means for simultaneously oscillating said shafts in opposite directions, and spring-pressed plungers supported by one shaft and adapted to be swung thereby toward the edge of the back to engage the edge of a matrix and position it in the back.

18. In a stereotype plate casting apparatus, the combination with a concave back and movable core, of a shaft arranged near the edge of said back and extending therealong, means for oscillating said shaft, a matrix holder movably supported by said shaft, whereby said matrix holder can be swung into engagement with the back, and means whereby when the matrix holder is out of casting position the core cannot be moved into the back.

19. In a stereotype plate casting apparatus, the combination with a fixed vertical concave back and movable core, of a pair of shafts arranged near the edges of said back and extending therealong, means for oscillating said shafts simultaneously, a matrix holder movably supported by each shaft, a lever, and means whereby when the lever is moved in one direction, the matrix holders will be turned toward the back, and the core will be released so that it can be moved into the back.

20. In a stereotype plate casting apparatus, the combination with a segmental back and movable core, of a pair of matrix holders arranged near the edges of said back and extending therealong, means whereby said matrix holders can be swung into engagement with the back, a lever, means for holding the core in open position, and means whereby when the lever is moved in one direction the matrix holders will be turned toward the back, and the core will be released so that it can be moved into the back, and whereby when the lever is moved in the other direction the matrix holders will be turned away from the back without releasing the core.

21. In a stereotype plate casting apparatus, the combination with a segmental back and movable core, of a pair of matrix holders arranged near the edges of said back and extending therealong, means whereby said matrix holders can be swung into engagement with the back, a lever, means for holding the core in open position, and means whereby when the lever is moved in one direction the matrix holders will be turned away from the back without releasing the core.

22. In a stereotype plate casting apparatus, the combination with a fixed back and a relatively movable core, of a pair of shafts extending along the edges of the back, matrix holders movably connected with said shafts to be operated thereby, a lever connected with said shafts for operating them, two operating devices on opposite sides of the pivot of said lever, whereby when one is depressed the matrix holders will be turned away from the back and when the other is depressed the matrix holder will be moved in toward the back, means for locking the core in position away from the back, and means operative when one of said devices is depressed for releasing the locking means, said locking means being operative when the other of said devices is depressed.

23. In a stereotype plate casting apparatus, the combination with a fixed concave back and movable core, of a matrix holder movably supported along the edge of said back, a lever, means whereby when the lever is moved the matrix holder will be turned toward the back and the core will be released so that it can be moved into the back, and manually operated means for moving the core into the back when released.

24. In a stereotype plate casting apparatus, the combination with a fixed upright back, of a core movable into the back and adapted to swing about a pivot below its bottom away form the back and then to turn farther away about another axis through an angle of about 90 degrees from the latter position.

25. In a stereotype plate casting apparatus, the combination with an upright back, of a core, means pivoted below the back and adapted to swing toward and from the back for supporting the lower end of the core while in casting position, means for swinging the core back on said pivot to an inclined position, and means for turning the core over about another axis and raising it with the cast plate thereon to a position in which it is inclined downwardly away from the back.

26. In a stereotype plate casting apparatus, the combination with an upright back, of a movable core adapted to move from an upright position within the back to a substantially transverse position outside the back, and means for supporting the core at one side of its center of gravity, whereby when a cast plate is on the core the thick riser thereof will overbalance the core and assist in turning it over to said transverse position, but when the plate has been delivered from the core, the core will have a tendency to turn back by gravity toward the vertical position.

27. In a stereotype plate casting apparatus, the combination with an upright vertical back, of a movable core adapted to move from an upright position within the back to a substantially transverse position outside the back, means for supporting the core at one side of its center of gravity, whereby when a cast plate is on the core the thick riser thereof will overbalance the core and assist in turning it over to said transverse position, but when the plate has been delivered from the core, the core will have a tendency to turn back by gravity toward the vertical position, said supporting means comprising rollers movable back and forth under the pivotal point of the core.

28. In an apparatus for casting stereotype plates, the combination with an upright back, of a movable core, a pair of horizontal tracks arranged adjacent to said back, rollers movable on said tracks, means supported by said rollers and connected with the core near its center of gravity, for causing the core to tip independently of any motion of the wheels from a vertical position near the back to a position inclined in the opposite direction.

29. In an apparatus for casting stereotype plates, the combination of a movable core, tracks arranged adjacent thereto, rollers connected with said core for supporting the core on said tracks, means for connecting said rollers with the core, and means for shifting said rollers under the core to change the support for the core from one side of its center of gravity to the other.

30. In a stereotype plate casting apparatus, the combination of a core adapted to carry a cast plate, a horizontal track for supporting the same, a wheel on the track, a lever pivotally connected with said core above the wheel, said lever having bearings on which said wheel is mounted, and means for swinging said lever on its pivot to change the position of said wheel relatively to the center of gravity of the core.

31. In a stereotype plate casting apparatus, the combination of a core adapted to support a cast plate, a lever pivotally connected with said core near the top thereof when the core is in horizontal position, said lever extending downwardly therefrom, a wheel carried by said lever, a track on which said wheel is mounted for supporting the core through the wheel and lever, a core turning bracket mounted on the core, a cam for operating said bracket, and means for turning the cam to move the core along the track and swing it on its axis.

32. In a stereotype plate casting apparatus, the combination of a core adapted to support a cast plate, a lever pivotally connected with said core above its center of gravity when the core is in horizontal position, said lever extending downwardly therefrom, a wheel carried by said lever, a track on which said wheel is mounted for supporting the core, a core turning bracket mounted on the core, a cam for operating said bracket, means for turning the cam to move the core along the track and swing it on its axis, and means for locking said cam in fixed position.

33. In a stereotype plate casting apparatus, the combination of a core adapted to support a cast plate, a lever pivotally connected with said core, a wheel carried by said lever, a track on which said wheel is mounted for supporting the core, a core turning bracket mounted on the core, a cam for operating said bracket, means for turning the cam to move the core along the track and swing it on its axis, means for locking said cam in fixed position, a matrix clamp, a bracket for controlling the position of said wheels on the track, and means connected with said locking means for operating the last named bracket.

34. In a stereotype plate casting apparatus, the combination with a back and a movable core, of a cam, matrix clamps on the back, and means controlled by said cam for simultaneously releasing a matrix in the back.

35. In a stereotype plate casting apparatus, the combination with a back and a movable core, of a cam, matrix clamps on the back, and means controlled by said cam for moving said matrix clamps out of the path of a cast plate on the core, and simultaneously releasing a matrix in the back.

36. In a stereotype plate casting apparatus, the combination with a back and a movable core, of a shaft adapted to be manually operated, a cam on said shaft having a cam surface thereon, matrix clamps on the back, a rock arm extending into position to be operated by said cam surface, resilient means for holding it in contact with said cam surface, a pawl on the rock arm, a pivoted arm which the pawl engages and operates as it moves in one direction, means whereby the pawl passes over said pivoted arm without operating it when it moves in the other direction, and connections from said arm to the matrix clamp.

37. In a stereotype plate casting apparatus, the combination with a back, a matrix, and clamps therefor, of a movable core, a handle for operating the core, and means whereby the first motion of the handle opens the clamps without moving the core and the remaining motion of the handle moves the core out of the back past the clamps.

38. In a stereotype plate casting apparatus, the combination with a back, of a core movable toward and from the same, plate lifters on the core, means for operating the plate lifters when the core is moved to extreme position out of the back, and matrix jaws, one on each side of the back, said matrix jaws and lifters constituting the side walls of the casting chamber between the back and core when the parts are in casting position.

39. In a stereotype plate casting apparatus, the combination with a back, of a core movable toward and from the same, a shaft for operating the core, plate lifting bars on the core, means on said shaft for operating the plate lifting bars when the core is moved to extreme position out of the back, and a tail sheet pivotally connected with one of the plate lifting bars.

40. In a stereotype plate casting apparatus, the combination with an upright back and matrix clamps therefor comprising matrix holders and locking slides for locking the matrix holders in closed position, of a core movable toward and from the back, plate lifters mounted on the core, and stops on the plate lifters in position to engage the locking slides and positively hold them when the core is moved into the back to force the matrix clamps solidly against the edges of the back.

41. In a stereotype plate casting apparatus, the combination with an upright back and matrix clamps therefor comprising matrix holders and locking slides for locking the matrix holders in closed position, of a core movable toward and from the back, plate lifters mounted on the core, stops on the plate lifters in position to engage the locking slides, said plate lifters being laterally movable and having headed studs for limiting their motion, whereby the said operation of the lifter stops will aline the edge of the plate lifters within the casting chamber with the edges of the matrix holders.

42. In a stereotype plate casting apparatus, the combination with a core adapted to support a cast plate thereon, of a lifter bar plate reciprocably mounted on each side of the core, lifter bars for said plates, studs for limiting the motion of said bars, and means for engaging said bars and lifting the plates when the core is brought into position for delivering the cast plate.

43. In a curved stereotype plate casting apparatus, the combination of a swinging matrix clamp having a jaw adapted to engage the concave side of the matrix, and a reciprocating bolster packing strip adapted to engage the convex side of the bolster.

44. In a stereotype plate casting apparatus, the combination of a back, and a matrix clamp swingingly mounted thereon, said clamp comprising a swinging element having a matrix jaw swingingly mounted thereon and a bolster packing strip reciprocably mounted thereon, said jaw and packing strip being adapted to grip a matrix between them when the clamp is closed into casting position.

45. In a stereotype plate casting mold, the combination of a permanently upright back, a core movable downwardly therefrom to deliver a cast plate, and a pivoted bottom ring for closing the bottom of the mold.

46. In a stereotype plate casting device, the combination with a mold having a part movable with the cast plate to deliver the plate, of means for receiving said movable part and a cast plate and holding it in inclined position, and a finishing device located in alinement therewith and in position to receive the plate therefrom without changing its direction of motion.

47. In a stereotype plate casting device, the combination with a mold having a movable core adapted to carry the cast plate with it, of a delivery rest for receiving the core and plate from the mold, a finishing arch, and a cooling device all in inclined alinement, whereby a plate can be fed by gravity in a straight line from the core, through the arch, to the cooling device.

48. In a machine for casting stereotype printing plates, the combination with a fixed back and a movable core, of a frame mounted adjacent thereto, means on said frame for engaging a plate and separating it from one of said mold parts as the frame moves away from the back, and guideways in position for receiving the plate from said separating means, the back, core, separating means and guideways being in vertical alinement, whereby the plate is prevented from moving sidewise during its transfer from the back to the guideway.

In testimony whereof I have hereunto set my hand, in the presence of two subscribing witnesses.

CHARLES E. HOPKINS.

Witnesses:
  ALBERT E. FAY,
  C. FORREST WESSON.